(12) United States Patent
Nyota et al.

(10) Patent No.: US 11,488,267 B2
(45) Date of Patent: Nov. 1, 2022

(54) MANAGING TRANSBOUNDARY WATER USE USING A DISTRIBUTED LEDGER AND MACHINE LEARNING

(71) Applicant: International Business Machines Corporation, Armonk, NY (US)

(72) Inventors: Timothy Nyota, Nairobi (KE); Isaac Waweru Wambugu, Nairobi (KE); Shikhar Kwatra, Durham, NC (US); Komminist Weldemariam, Ottawa (CA); Fred Ochieng Otieno, Nairobi (KE)

(73) Assignee: INTERNATIONAL BUSINESS MACHINES COPRORATION, Armonk, NY (US)

(*) Notice: Subject to any disclaimer, the term of this patent is extended or adjusted under 35 U.S.C. 154(b) by 398 days.

(21) Appl. No.: 16/784,685

(22) Filed: Feb. 7, 2020

(65) Prior Publication Data
US 2021/0248692 A1 Aug. 12, 2021

(51) Int. Cl.
*G06Q 50/06* (2012.01)
*G06N 3/08* (2006.01)
(Continued)

(52) U.S. Cl.
CPC ......... *G06Q 50/06* (2013.01); *G06F 16/2365* (2019.01); *G06F 16/2474* (2019.01);
(Continued)

(58) Field of Classification Search
CPC ...... G06Q 50/06; G06Q 10/10; G06Q 20/145; G06Q 20/389; G06Q 30/0206;
(Continued)

(56) References Cited

U.S. PATENT DOCUMENTS 8,887,324 B2 * 11/2014 Klicpera ............... B05B 12/004
4/643
10,938,700 B2 * 3/2021 Cohen .................... H04L 47/70
(Continued)

FOREIGN PATENT DOCUMENTS

AU 2021106935 A4 * 12/2021
WO WO-2017155634 A1 * 9/2017 ........... A61B 5/0507
(Continued)

OTHER PUBLICATIONS

Harsgadeep et al., "Disruptive Technologies for Improving Water Security in Large River Basins", Creative Commons Attribution, MDPI.. (Year: 2020).*
(Continued)

*Primary Examiner* — Frantzy Poinvil
(74) *Attorney, Agent, or Firm* — Barak Cohen, Esq.; McGinn I.P. Law Group, PLLC.

(57) ABSTRACT

A trans-boundary water resource usage detection method, system, and computer program product, including predicting an estimated water usage by an upstream administrative region using a machine learning model and a tracked water usage, detecting an excess water usage when the estimated water usage exceeds a contracted usage value by more than
(Continued)

a threshold value by executing a smart contract on blockchain, and penalizing, via a token exchange in blockchain, the upstream administrative region for the excess water usage by executing the smart contract on blockchain.

20 Claims, 9 Drawing Sheets

(51) Int. Cl.

| | |
|---|---|
| *G06N 3/04* | (2006.01) |
| *G06F 16/2458* | (2019.01) |
| *G06F 16/28* | (2019.01) |
| *G06F 16/23* | (2019.01) |
| *G06Q 30/02* | (2012.01) |
| *G06Q 20/14* | (2012.01) |
| *G06Q 20/38* | (2012.01) |
| *G06Q 40/04* | (2012.01) |
| *G06Q 10/10* | (2012.01) |
| *G16Y 40/10* | (2020.01) |
| *G16Y 10/35* | (2020.01) |

(52) U.S. Cl.
CPC ............. *G06F 16/285* (2019.01); *G06N 3/04* (2013.01); *G06N 3/08* (2013.01); *G06Q 10/10* (2013.01); *G06Q 20/145* (2013.01); *G06Q 20/389* (2013.01); *G06Q 30/0206* (2013.01); *G06Q 40/04* (2013.01); *G16Y 10/35* (2020.01); *G16Y 40/10* (2020.01)

(58) Field of Classification Search
CPC ... G06Q 40/04; G06F 16/285; G06F 16/2365; G06F 16/2474; G06N 3/04; G06N 3/08; G06Y 40/10; G16Y 10/35
USPC ....................... 705/3–44; 706/3–44
See application file for complete search history.

(56) References Cited

U.S. PATENT DOCUMENTS

| | | | | |
|---|---|---|---|---|
| 11,392,841 | B2* | 7/2022 | Alsubai | G06N 5/04 |
| 2019/0037787 | A1* | 2/2019 | Kumar | G01K 3/005 |
| 2019/0234786 | A1* | 8/2019 | Klicpera | G01M 3/26 |
| 2019/0372827 | A1* | 12/2019 | Vasseur | H04L 41/16 |
| 2021/0334913 | A1* | 10/2021 | Klein | G01F 15/06 |
| 2021/0372837 | A1* | 12/2021 | Alcorn | G01F 1/662 |

FOREIGN PATENT DOCUMENTS

| | | | | |
|---|---|---|---|---|
| WO | WO-2019012418 A1 * | 1/2019 | | G01F 7/00 |
| WO | WO 2019/209059 A1 | 10/2019 | | |

OTHER PUBLICATIONS

Mel, et al. "The NIST Definition of Cloud Computing". Recommendations of the National Institute of Standards and Technology. Nov. 16, 2015.

"Building block(chain)s for a better planet", http://www.pwc.com/gx/en/sustainability/assets/blockchain-for-a-better-planet.pdf, PWC 2018.

Rafael Benitez, et al., "A Short-Term Data Based Water Consumption Prediction Approach", https://www.mdpi.com/1996-1073/12/12/2359/pdf, Energies, 2019.

Oliver Rusell, "Blockchain And Water: Everything You Need to Know", https://hackernoon.com/blockchain-and-water-everything-you-need-to-know-b7e753108715, Oct. 31, 2018.

"The Impact of Blockchain Technology on the Surveying Industry, Cadastre and Land Registry Systems", https://landportal.org/blog-post/2019/08/impact-blockchain-technology-surveying-industry-cadastre-and-land-registry-systems, Jul. 16, 2019.

* cited by examiner

US 11,488,267 B2

MANAGING TRANSBOUNDARY WATER USE USING A DISTRIBUTED LEDGER AND MACHINE LEARNING

BACKGROUND

The present invention relates generally to a trans-boundary water resource usage detection method, and more particularly, but not by way of limitation, to a system, method, and computer program product for detecting when the usage of water in a transboundary water resource exceeds a specified threshold and reconciling thereof.

Transboundary water refers to water resources shared by two or more countries or territories. These resources include aquifers, river basins, lakes and canals. These resources often support the livelihoods of the populations within the nations sharing them for commercial, domestic, agricultural and ecological use. Depleted transboundary water resources thus have the potential to cause acute water shortage, acute unrest and conflict between nations sharing them. To manage access/usage of transboundary waters and to alleviate the potential for conflict over these waters, countries often come together to form treaties to ensure sustainable and equitable use therefore ensuring fair access/usage and peaceful coexistence. An important part of such treaties is agreement on principles for participation for decision making to ensure transparency of apportioning water and other benefits arising thereof. Participating countries thus need to adopt inclusive and transparent management approaches to ensure legitimacy and fairness. Participating countries must be cognizant of the conceptions and principles of fairness and equity pertaining to customary international law on water; they need to address and agree on what the terms 'equitable' and 'fair' mean to them since more often than not, this concept of equity and fairness heavily relies on subjective interpretation of outcomes, based on factors such as historical entitlements, background and social context.

The Technical Committee of Global Water Partnership measures transboundary water cooperation by evaluating the implementation of integrated water resources between the countries sharing the water resource using the following criteria: existence of a joint body, a joint management plan, regular communication and information exchange. A major issue that riparian countries contend with is optimal allocation versus equity; riparian countries have engaged in direct payments for benefits received and compensation for costs as a result of usage of transboundary water including direct monetary payment for water used, power-purchase arrangements and financing and ownership agreements.

Conventional techniques cover measures around measuring, collecting and transmitting water usage data from commercial and residential setups via IoT-connected cloud and to model this water usage within a particular region by calculating the water balance of each water system component within a spatial region of interest using various IoT and sensor technologies. Other conventional techniques cover the use of acoustic data to monitor water consumption and determine excesses over a pre-determined threshold. Additional conventional techniques also highlight the execution of a water accounting model and generating visualizations of water usage by utilizing usage data from various installed sensors/meters. High water usage periods are identified by aggregating usage data over a period and grouped in times to determine the group of periods with the highest water usage.

However, conventional techniques do not cover the execution of smart contracts on blockchain to store water usage patterns in blockchain. Impact assessment of water usage is also not covered in but forms an important angle in this embodiment since it is used to determine the economic value to be incorporated in the model in evaluating token values, which is then compared to usage values. There is also an opportunity to execute token exchange between riparian countries based on water usages and impacts on other countries sharing the water resources.

Thus, there is a need in the field to mobilize a global cloud based blockchain platform for monitoring transboundary water use and risks.

SUMMARY

In an exemplary embodiment, the present invention provides a computer-implemented transboundary water resource usage detection method, the method including predicting an estimated water usage by an upstream administrative region using a machine learning model and a tracked water usage, detecting an excess water usage when the estimated water usage exceeds a contracted usage value by more than a threshold value by executing a smart contract on blockchain, and penalizing, via a token exchange in blockchain, the upstream administrative region for the excess water usage by executing the smart contract on blockchain.

One or more other exemplary embodiments include a computer program product and a system, based on the method described above.

Other details and embodiments of the invention will be described below, so that the present contribution to the art can be better appreciated, Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
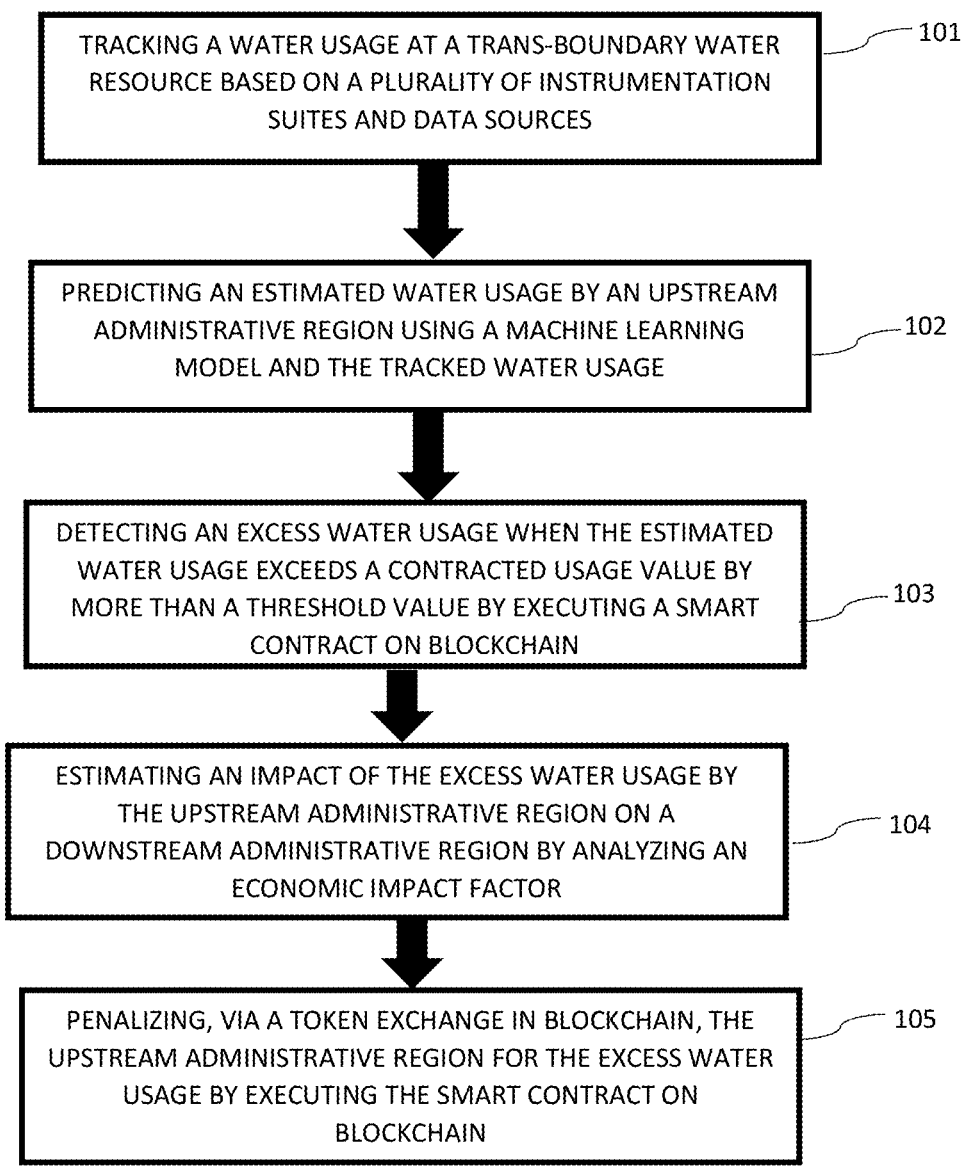
FIG. 1 exemplarily shows a high-level flow chart for a trans-boundary water resource usage detection method 100 according to an embodiment of the present invention.
Figure 2:
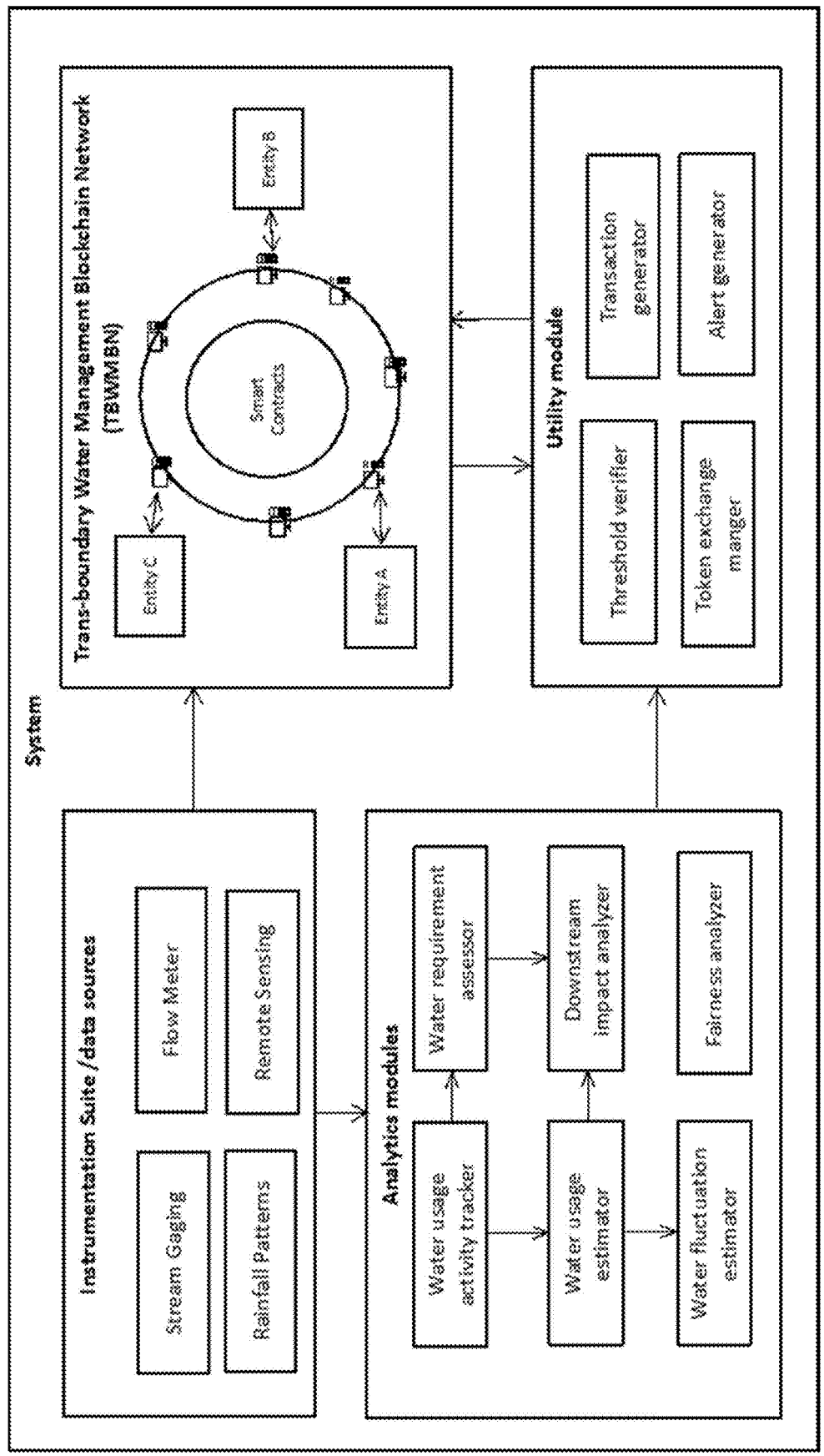
FIG. 2 exemplarily depicts a system implementation of method 100 according to an embodiment of the present invention.
Figure 3:
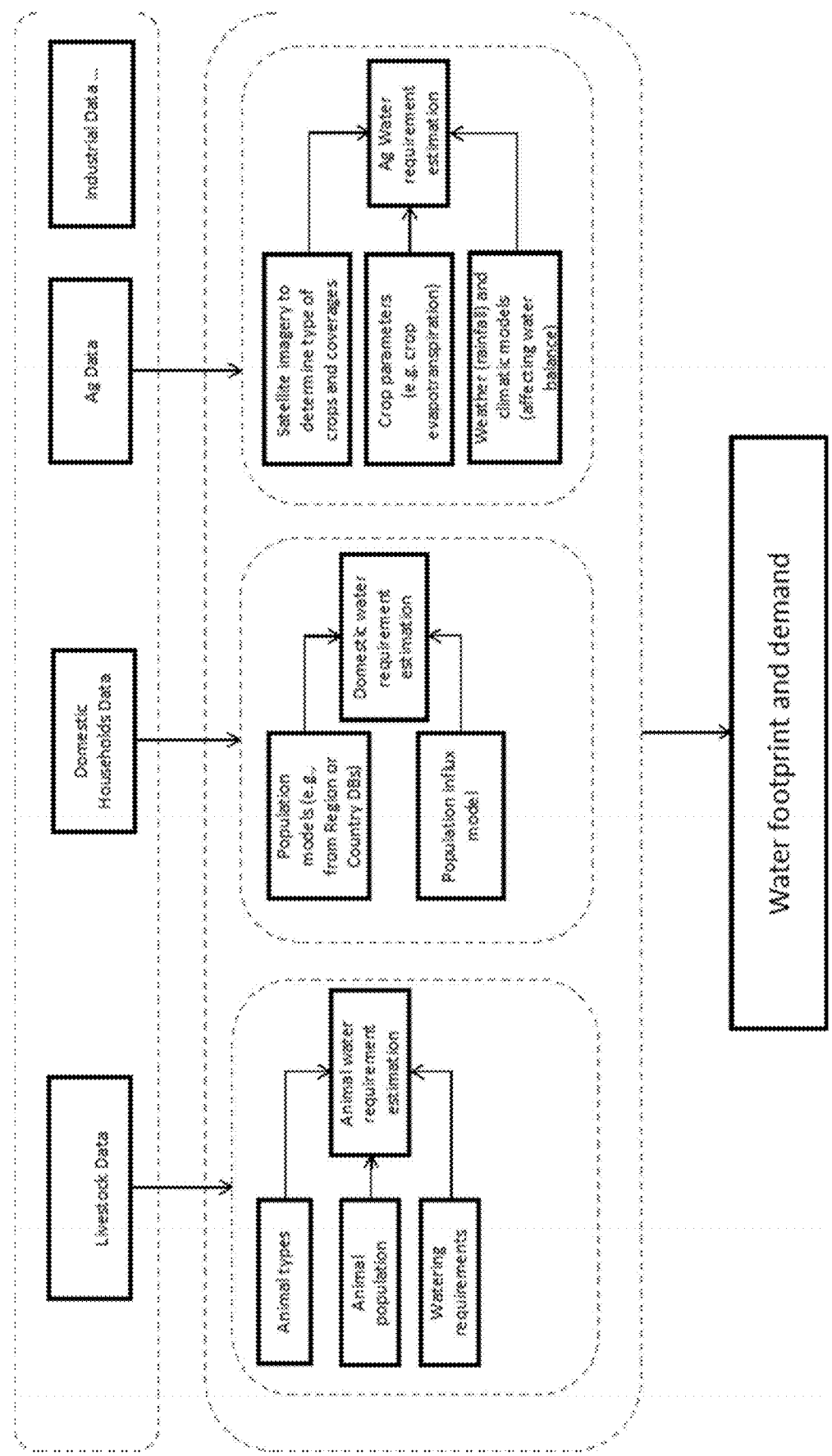
FIG. 3 exemplarily depicts a water requirement assessor according to an embodiment of the present invention.

The invention will now be described with reference to FIGS. 1-9, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a trans-boundary water resource usage detection method 100 according to the present invention can include various steps for triggering of "token exchange" based on water being used in excess and estimated downstream impact caused by excess water being used.

Figure 7:
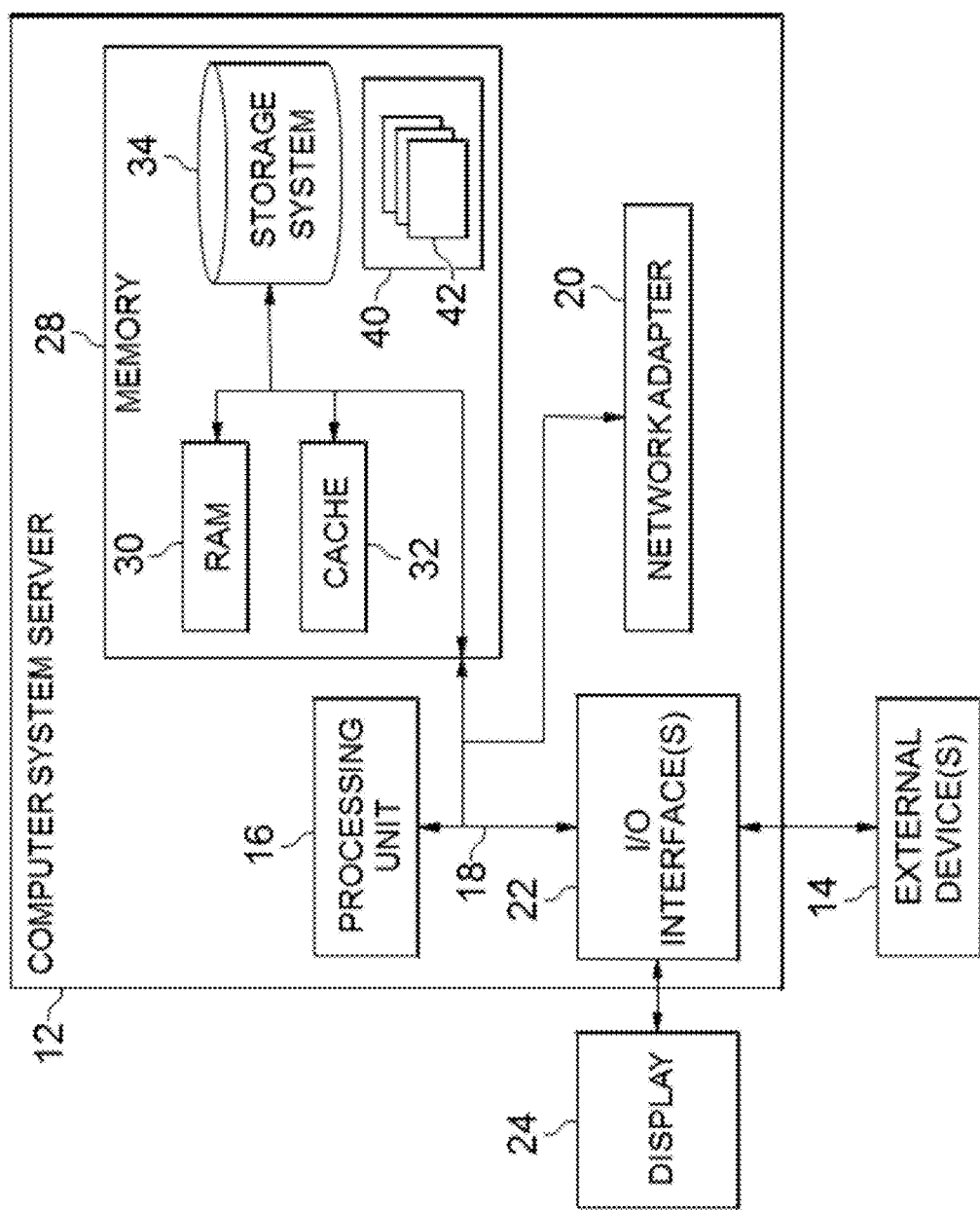
FIG. 7 depicts a cloud-computing node 10 according to an embodiment of the present invention.

By way of introduction of the example depicted in FIG. 7, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 9), it is nonetheless understood that the present invention can be implemented outside of the cloud environment.

With reference to FIGS. 1-6 and as discussed later in more detail, in step 101, a water usage at a transboundary water resource is tracked based on a plurality of instrumentation suites and data sources.

In step 102, an estimated water usage by an upstream administrative region is predicted using a machine-learning model and a tracked water usage.

In step 103, an excess water usage is detected when the estimated water usage exceeds a contracted usage value by more than a threshold value by executing a smart contract on blockchain.

In step 104, an impact of the excess water usage by the upstream administrative region on a downstream administrative region is estimated by analyzing a plurality of economic impact factors.

In step 105, the upstream administrative region is penalized, via a token exchange in blockchain, for the excess water usage by executing the smart contract on blockchain.

Thereby, via the method 100, the invention may monitor water release and subsequent usage/use in water infrastructure on transboundary water bodies such as dams. Moreover, the invention may monitor water transfers and withdrawals in transboundary water courses such as rivers and canals for agricultural, industrial and domestic water use. Also, the invention may provide an early warning system for managing sensitive ecological systems such as lakes, riparian zones and wetlands that are affected by water withdrawals from transboundary water resources. And, the invention provides a system for managing consensus for various water management alternatives for transboundary water bodies.

With general reference to FIGS. 1-6, the invention utilizes a Transboundary Water Management Blockchain Network (TWMBN). This blockchain network is made up of the administrative regions making up the cross-border water basin as organizations in the blockchain.

That is, a blockchain is used to create a tamper-proof record and one or more smart contracts to help the management and governance of transboundary uses associated with shared water resources and verify whether the extraction and usages (e.g., industrial pollution, infrastructure projects with downstream impacts) of water resources are fair and valid to address conflicting water interests, and allow to track and communicate extreme flood or drought events with one another while instantly sharing information and managing water quality and quantity expectations among nations, track estimated water fluctuation levels, etc. For instance, a request ("token") to extract certain additional amount water from a shared river for watering a plantation by an administrative region X. One or more downstream administrative regions relays certain economic impact factors associated with the excessive extraction of water to a blockchain service. The "token" is granted to the administrative region X if one or more economic impact factors verified, accepted and agreed upon.

The blockchain service is used to store rules and regulations governing water extraction rates. Thus, each time water is extracted the rate will be approved by triggering one or more smart contracts. The blockchain service is also used to record yield at each water point of shared water resource.

The blockchain service invokes one or more smart contracts associated with expected one or more (current and predicted) economic factors to help approve the token (and service level agreements), with stored or dynamically composed consents, and to help determine if a token is permitted for that additional extraction at a water point, as well as to determine the specific selected economic factors and obligations that the administrative region X predicted to comply with at a specified time period. The smart contracts are immediately available to the token validation system at the point of water extraction, which can check extraction rates, terms and conditions, and that the relevant encounters associated with the water fluctuation level with selected/relevant economic factors (e.g., cost). In further embodiment, the method of dynamically composing consent is based on analysis of economic factors and predictive evaluation of the administrative region X context.

When the extraction of the required amount (as per the token) completes, the system relays the completion information to the blockchain service along with the rate of extraction, current water level, and additional metadata. The smart contract and the consensus protocol in the blockchain extraction token service may determine transactions and/or token and/or any service/contractual agreements and associated economic impacts to another poll based on the new administrative region desired ledger. The smart contract on the blockchain service then optionally sends alerts (or tokens) for the administrative regions to progress report (e.g., alert), based on the degree of water extraction (e.g., depletion, drought) importance.

The management, fairness and equitable token sharing between administrative regions for sharing water resources using blockchain service can further be enhanced by: i) configuring blockchain-enabled water basin sensors and payment system; ii) learning, by storing the various events (weather forecast, climate shocks, drought, flooding, etc.). Not only does it use this information to generate and validate tokens and "unfair" upstream water usages, but the system learns what economic factors are useful to manage water quality and quantity expectations as well as to manage regulations using one or more machine learning algorithms.

In one embodiment, for water usage tracking, techniques for data collection include plurality of data sources include deploying hydromet (Hydrological and meteorological remote sensing) systems along the river basin in all involved countries of transboundary water use to collect data such as river flow, water level, water quality, sediment transport, reservoir/lake levels, etc. Groundwater storage variation may be obtained from the residual of total water storage observed by NASA's Gravity Recovery and Climate Experiment (GRACE) after removing variations snow water, surface water and soil moisture storage.

Techniques for determining demand may use water footprint, the amount of local water resources that are used to produce goods and services within a region-of-interest (a given geographic region, demarcation, or a country). The monthly water footprint per region-of-interest basin unit can be calculated by aggregating the global water footprint to the region-of-interest basin spatial resolution. These water footprints were calculated by summing agricultural, industrial and domestic water consumptions. The monthly available water by country-basin unit after upstream water consumption is determined by adding the accumulated actual runoff and the water footprint within each country-basin unit. The monthly accumulated actual runoff within each country-basin unit can be obtained by multiplying the actual runoff by accumulated area. This way, the system may establish a mechanism to estimate the monthly variations in terms of water availability and footprint among these spatial units.

In one embodiment, for the detection of step 103, the invention includes detecting when a water usage passes above agreed usage amount (specified as tolerance threshold on the blockchain) by measuring and analyzing stream flow affecting a river's hydrology, and data stored on the TBWMBN. In one example, this may be done by plotting out the state-discharge relation and determining a stream gauge to discharge relation over a given period. This provides a useful information on stream flow over a given time period.

Figure 4:
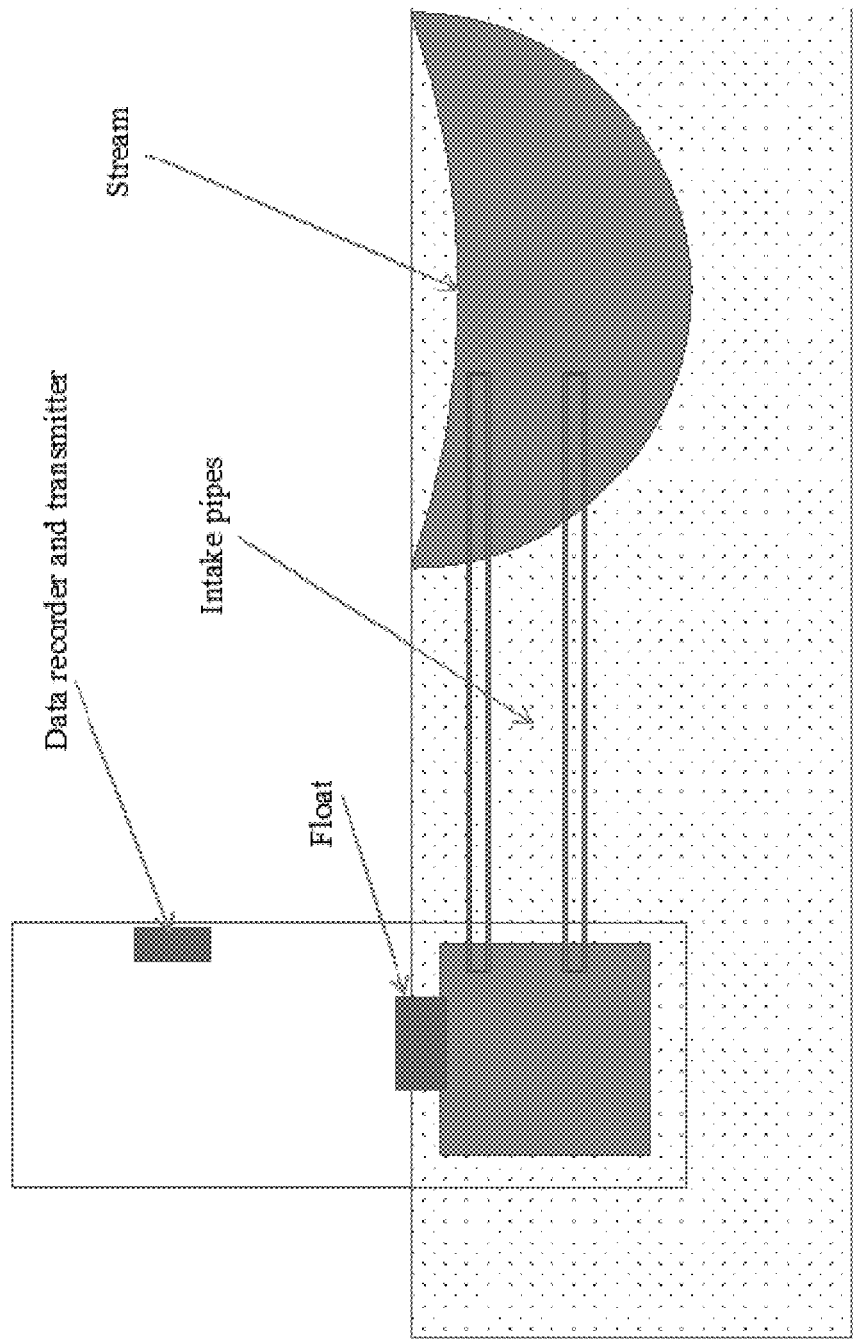
FIG. 4 exemplarily depicts a stream flow example according to an embodiment of the present invention.
Figure 5:
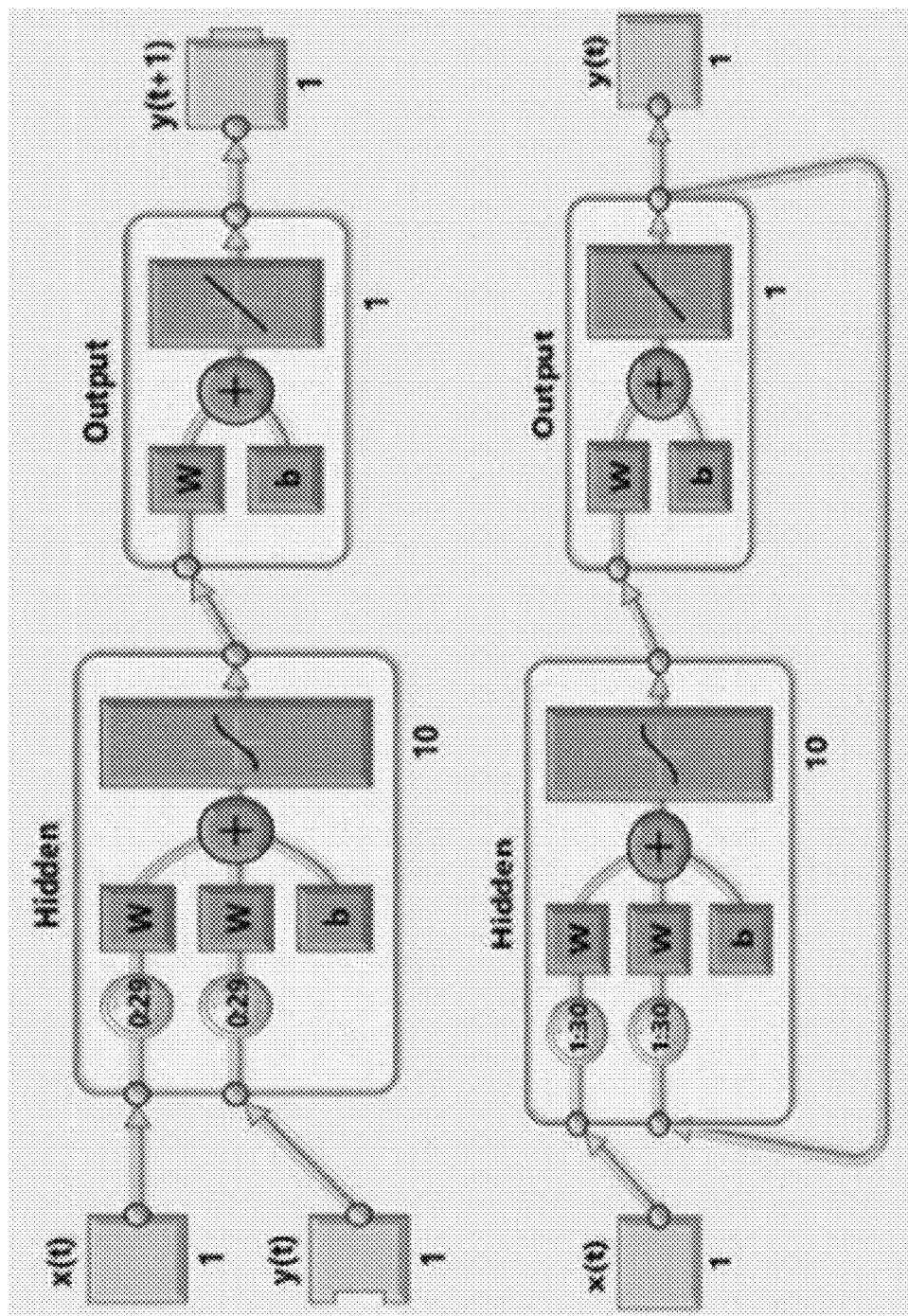
FIG. 5 exemplarily depicts an ANN training architecture where x(t) represent the time series input variables while y(t) represent the actual target values used to train according to an embodiment of the present invention.

The first step of measuring stream flow involves measuring stage (see FIG. 4). A stilling well is installed in the riverbank. An underwater pipe (can be sensor enabled) is used as an intake at the same elevation as the river. A Float, connected to a pressure sensor measure the "stage" or "level" of the river at a particular moment, and does so in intervals, e.g., every 15 minutes. This data can then be relayed back to a remote computer using the data recorder and transmitter device.

Secondly, after the measuring stage, the invention computes a discharge rate as the volume of water flowing in a river per unit of time (i.e., area * velocity using current meter and acoustic Doppler current profiler). Alternatively, a variant of the USGS's streamflow measuring can be used. This is also done after a predefined time and plotted. The streamflow information being reported across the various administrative regions is monitored to ensure uniformity and quality in data being collected. The aim of the administrative regions using a shared water resource would be to maintain this relation properly, and any anomalies will be detected by the system and stored on the ledger.

For modeling a fluctuation level across transboundary shared water resources (i.e., step 103), in some embodiments, the invention estimates and tracks water fluctuation levels driven by weather patterns or rainfall patterns as a function of change in groundwater storage (supply and recharge) and groundwater extraction rates. The method of estimating water supply is done by instrumenting every water-point such as a borehole (e.g., step 102). In a simplistic form, an extraction rate can be multiplied by the operating hours to determine the yield at a specific water-point. The water yield at a specific water-point can further be predicted using machine learning models that use historical extraction data, historical yield forecast, historical consumption, weather and climate models, etc.

The invention further estimates the amount of water to recharge for a given water point using various variables including weather data, seepage measure and ground percolation. Recharge is the process of water addition to the saturated zone such as aquifers. The invention can determine the recharge rate by observing the water table elevation of the shallow wells in the area. The water table is the upper surface of the zone of saturation. The assumption is that the water table elevation is due to addition of recharge and is uniform across the water table.

In one implementation example, the recharge can be estimated using the formula (1)

$R(tj)=Sy*H(tj)$, where $R(tj)$ (cm) is recharge occurring between times tO and tj, Sy is specific yield (dimensionless), and $H(tj)$ is the peak water level rise attributed to the recharge period (cm).

The estimation of water fluctuation level further uses groundwater extraction rate from supply and the recharge rate. If needed, the estimation model further incorporating weather data to increase accuracy in our estimation. For example, if precipitation is used as a binary variable, it can lead to a 23% increase in borehole extraction frequency the next week. A 1 mm increase in rainfall can lead to a 1% reduction in the use of ground water the next week. This means that demand for ground water is affected by precipitation and thereby weather data has linear correlation to ground level fluctuation rate.

Over time, the water fluctuation value, when calculated daily, becomes the basis of time series data that becomes one of the input values to the machine-learning model. Thus, in another embodiment, training a machine-learning model to determine the fluctuation level of the ground water in trans-boundary region-of-interest. Input for the machines learning model may be, for example, historical water table elevations (monthly), historical rainfall (monthly), soil types, historical specific yield (Sy), deep drainage, historical evapo-transpiration, etc.

Two classes of hydrological models are envisaged: (i) a data driven machine learning model and (ii) physics based model. The data-driven model is a location specific model that requires less information about physical characterization of a place and rely mostly on existing data sources and other existing hydrological processes data from other systems that may exist in a region. For instance, if administrative region "A" already has hydrological data on a region, this data feeds into the data-driven model. The output presented is a region specific. In one implementation example, training a class of artificial neural network (ANN) model called Levenberg-Marquardt algorithm (e.g., see FIG. 5). ANN is effective as it works with the least amount of parameterization yet derive useful information from time series data. ANN has better predictability power but low explanatory depth.

The output of the hydrological model is the predicted parameters for groundwater monitoring such as predicted supply, demand, depletion rate and future aquifer fluctuation rate. This influence the amount of token of the shared resource to offer a specific region. A back propagation neural network can now be used to model and analyze peaks and their timing since these are crucial for decision making.

Over time, a nonlinear autoregressive neural network model can be trained to approximate long-term changes across regions and estimate/predict water table levels based on exogenous inputs.

For the physical model, the invention analyzes a physically measurable input variable. It does not rely on results from other models. In this case, the inputs are usually data from instrumentation as well as yield from flow meters. The physical models are hard to predict especially when input values change over time or are affected by external factors not incorporated in the model due to their unmeasurable nature. Therefore, the physical model would serve as our ground truth.

In another embodiment, the invention may deploy K-means clustering on multivariate time-series feature set.

For training of the ANN, the invention splits waveform data including of time series input variables (shown previously) into segments of n samples (windowing), forms a space in n dimensions, with each segment represents one point, determines clustering of segment points, and determine the centers or centroids of the clusters, and cluster centroids provide library of "normal" waveform shapes. For the testing of the ANN, the invention reconstructs waveform data to be tested using cluster centroids learned during training. Poor reconstruction error on any individual segment indicates anomalous shape. Such anomalous shapes that are occurring using the classifier form the anomalous water excess, which falls out of the threshold range and hence can be clustered under excess water usage (based on ranging above or below the threshold level identified by anomalous values and Euclidean distance of the centroid from said water marker levels/metadata information).

In one scenario, the invention, via step 104, estimates the impact caused by excess water being used to "downstream" regions based on analyzing plurality of economic factors such as livestock related indicators, domestic household indicators, agricultural indicators, industrial related indicators, weather data, etc. In one embodiment, the invention customizes a scenario planning to model the relationship between these indicators in order to explain the current and future water requirements by an administrative region against detected or predicted excess water usage by upstream regions.

This helps businesses or policy-makers to learn about possible alternative water extraction and anticipating any consequence a head of time. In addition, this is used to determine the amount of token the administrative region to receive. By applying AI-based planning, guided by expert domain knowledge as some water shortage related scenarios have never yet occurred and thus cannot be projected by probabilistic means. It is noted that amount of water available for extraction by a particular administrative region will be dependent on the stream flow information discussed above. The amount of water available for extraction by a particular administrative region will be dependent on the stream flow information discussed above. the system assumes if administrative regions in upstream consume excessive water or build reservoirs from shared water resources like rivers, the downstream administrative regions may face the risk of water shortage.

Figure 6:
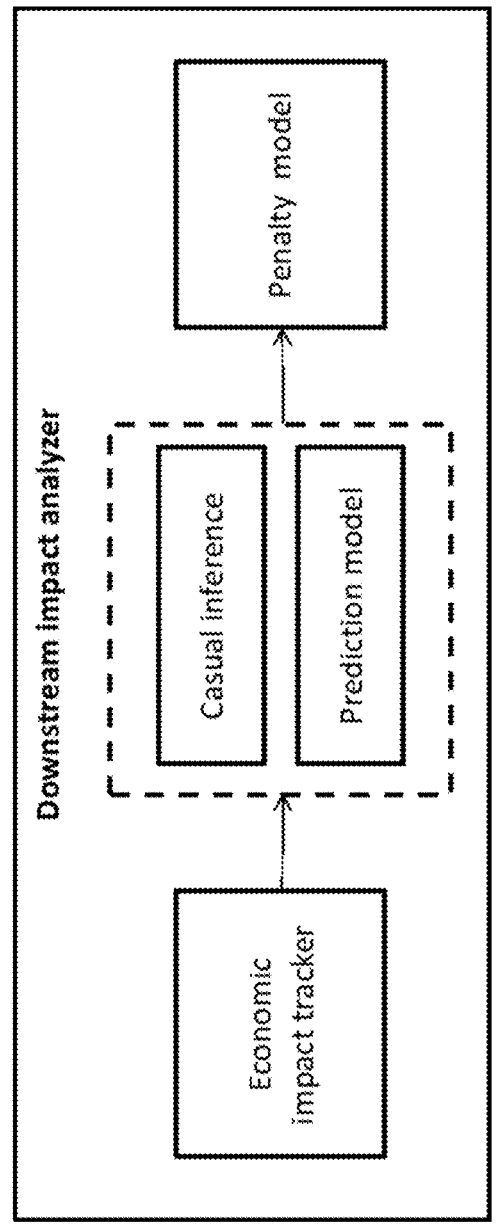
FIG. 6 exemplarily components of the downstream impact analysis according to an embodiment of the present invention.

With reference to FIG. 6, through the analysis of the shared resources usages using the methods and algorithms discussed above, the invention can determine and track the economies that share this resource. This data can be used for policy targeting and token allocation. In order to do allocations in a meaningful way, the invention may analyze the current economic indicators as well as forecast the future which impacts the budgeting and allocation. There are two methods which may be used for determining the economic impact: Causal inference and Prediction.

For causal inference, in one embodiment, the invention generates a standard econometric model that analyzes the causal relationships between the different aspect of the economy such as farming, marketing, industry, weather, climate etc. For instance, if an administrative region "A" receives more rainfall than administrative region "B", it is likely that there is a higher correlation of the weather to affect agriculture and industry sector. This correlation of the different economic aspects helps feed the econometric model.

For prediction, by providing early assessment of each sector of the economy, the invention may estimate the economic growth of an economy. For example, by using Gaussian process, the invention can evaluate policy intervention by tweaking some parameters and methodologies. This may indicate the impact that certain predefined policies may have on an economy. In this case, the econometric model may identify the impact that may be caused by either increasing or decreasing the token allocation as well as analyze the optimum allocation for each region. The impact of each decision can then be simulated by adjusting each variable in the model based on the desired outcomes. Both the industrial consumption and domestic consumption form the consumer preference index which when monitored over time provide a time series data that feeds onto a machine-learning model.

For the penalizing (e.g., step 105), since there is cross-border monitoring of the region's economies, any violation to the allocation is easy to identify (threshold verifier) based on analyzing extraction and consumption models. A violation to the rules/policies (implemented by one or more smart contracts) may thus be penalized.

The invention incorporates token crediting whereby monitoring the precipitation in a specific region through weather data. It may automatically update the tokens for the given region considering their dependence on the water resource is reduced and additionally, water resource is being replenished. Hence, if there is another region requiring more water from the resource due to adverse weather as determined by weather data then, the said region is given more tokens.

The blockchain service further is used to store allotted token units based on in-administrative region basin area and projected demand based on the water footprint, consumed token units based on each administrative region's water consumption, transferrable token units based on when administrative region is not extensively utilizing its allotted tokens, relief token units can either be positive or negative. This ill be positive for when an administrative region has received tokens to boost its inadequacy and negative for the administrative region that has traded its surplus tokens, and economic unit used to offset the tokens transferred from an administrative unit with surplus to one with deficiency.

The smart contracts will operate as follows:
 i. The consumed token units are monitored in real-time as they are updated based on water consumption retrieved from the IoT/sensor (e.g., hydromet) system.
 ii. Thereafter the invention compares the consumed token units to the allotted token units. Using the machine-learning model, which has a nonlinear autoregressive neural network, we can forecast, consumed token units considering the hydrological model.
 iii. The consumption forecast will then feed into determining whether the administrative area has a near emergency in the event they are about to exhaust their allotted tokens versus they have surplus when due to lesser dependence on the cross-border water source.

iv. When the token units are in excess, the transferrable token units are increased based on the excess.

v. When the token units are insufficient to meet the administrative unit's demand, if there are transferrable tokens available from another administrative unit, these tokens are transferred to the administrative unit in need and an exchange in economic equivalent of the tokens received transferred to the administrative unit providing the token units.

vi. In the event that there are no available token units from other administrative units, the administrative unit with deficiency will be alerted to institute austerity measures in order to efficiently utilize the units available to it.

In a secondary embodiment, the invention may compute fairness and equitable token sharing between countries sharing water resources. Each country is assigned to a pool. Different pools represent the various identified categories of water usages. For example, Domestic use—Pool A; Agricultural use—Pool B; Animal farming—Pool C.

Each pool is assigned a set of tokens or shares, from a predetermined finite set. The more the shares that a pool has, the greater the allocation of water from the identified resource. By default, all pools are given equal tokens/shares but it is possible to assign more or less tokens based on the type of usage, individual country needs, seasonality (e.g., drought season).

To ensure equitable distribution, each country is assigned to the various pools based on agreed upon water usage needs. A given country may choose to distribute tokens from one pool to the next.

Unused tokens are stored in a 'reservoir' and when need arises, the unused tokens are allocated between the various countries as agreed upon. For instance, country "A" has been experiencing rainfall and usage of the shared water resource has reduced. This state is captured by the invention and the excess tokens are noted and are eligible for transfer to another country "B" which may require extra tokens. Vice versa, from weather conditions monitoring, the invention may establish the lack of precipitation in country "L", and an increased or steady rate of exhausting the allotted tokens then such a country will be red flagged as eligible for a token top up.

Countries can also trade their tokens to other countries, for a consideration that they (the countries) agree upon. The riparian countries have to adhere to the set tokens. Exceeding the set level of tokens raises an alert and the violating country receives an alert that the level of water has exceeded the set limits. The invention implements an auto rationing in cases of exceeding limits or during drought.

Thereby, the monitor keeps track of water usage by each country in each pool. The monitor also keeps track of the water available (flow meter readings and other sensors). It sends signals to the system monitor which in return reduces the number of allocated tokens in an equitable manner (e.g., reducing 10 tokens from each country in Pool A, 15 tokens from each country in Pool B, etc.). The scheduler also determines the most critical country/usages combinations and prioritizes them ahead of less critical combinations, in an attempt to mitigate drought effects. A country can also reallocate its own tokens to fit configurations most suitable to their current conditions.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 7, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 8:
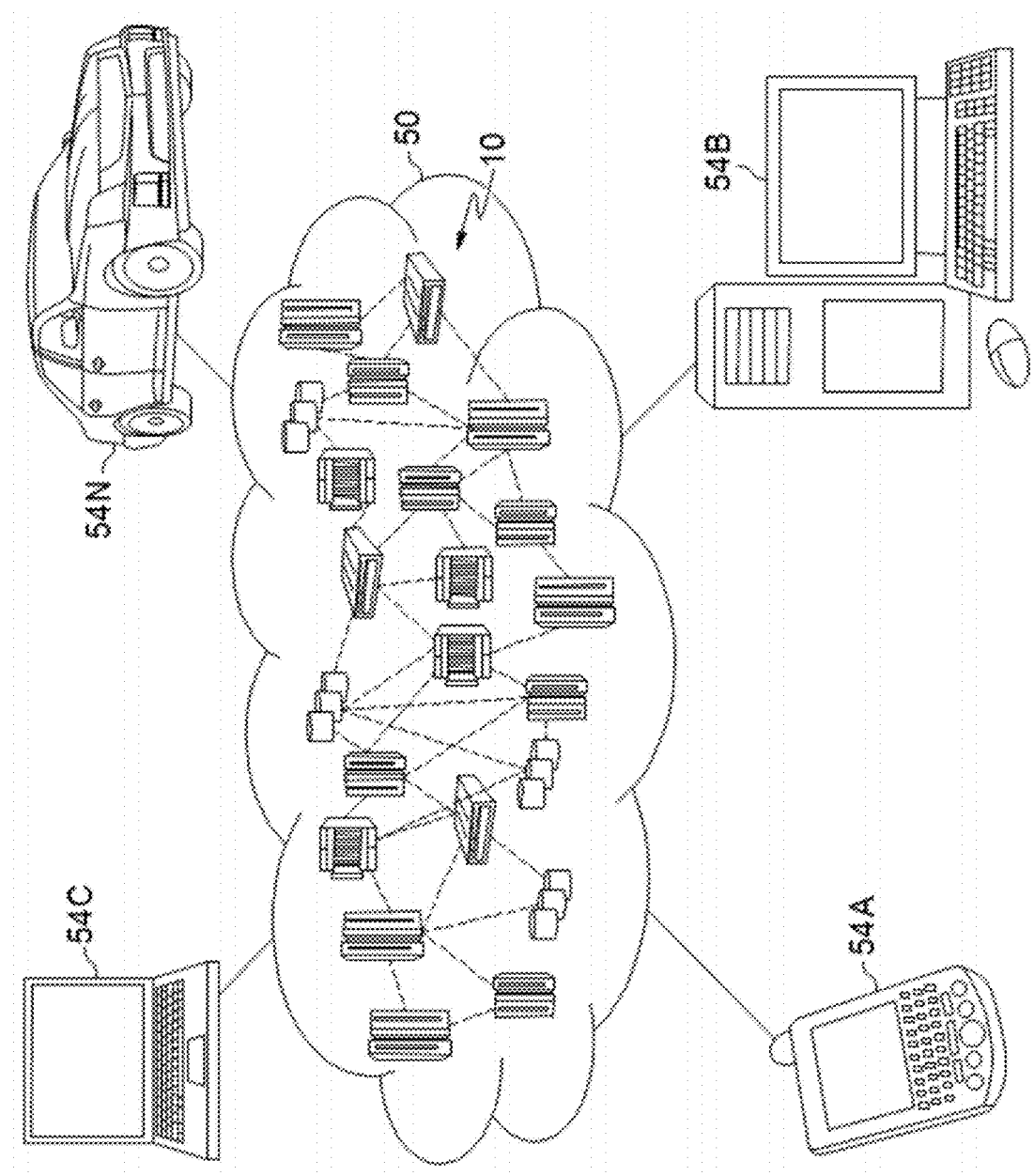
FIG. 8 depicts a cloud-computing environment 50 according to an embodiment of the present invention.

Referring now to FIG. 8, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Figure 9:
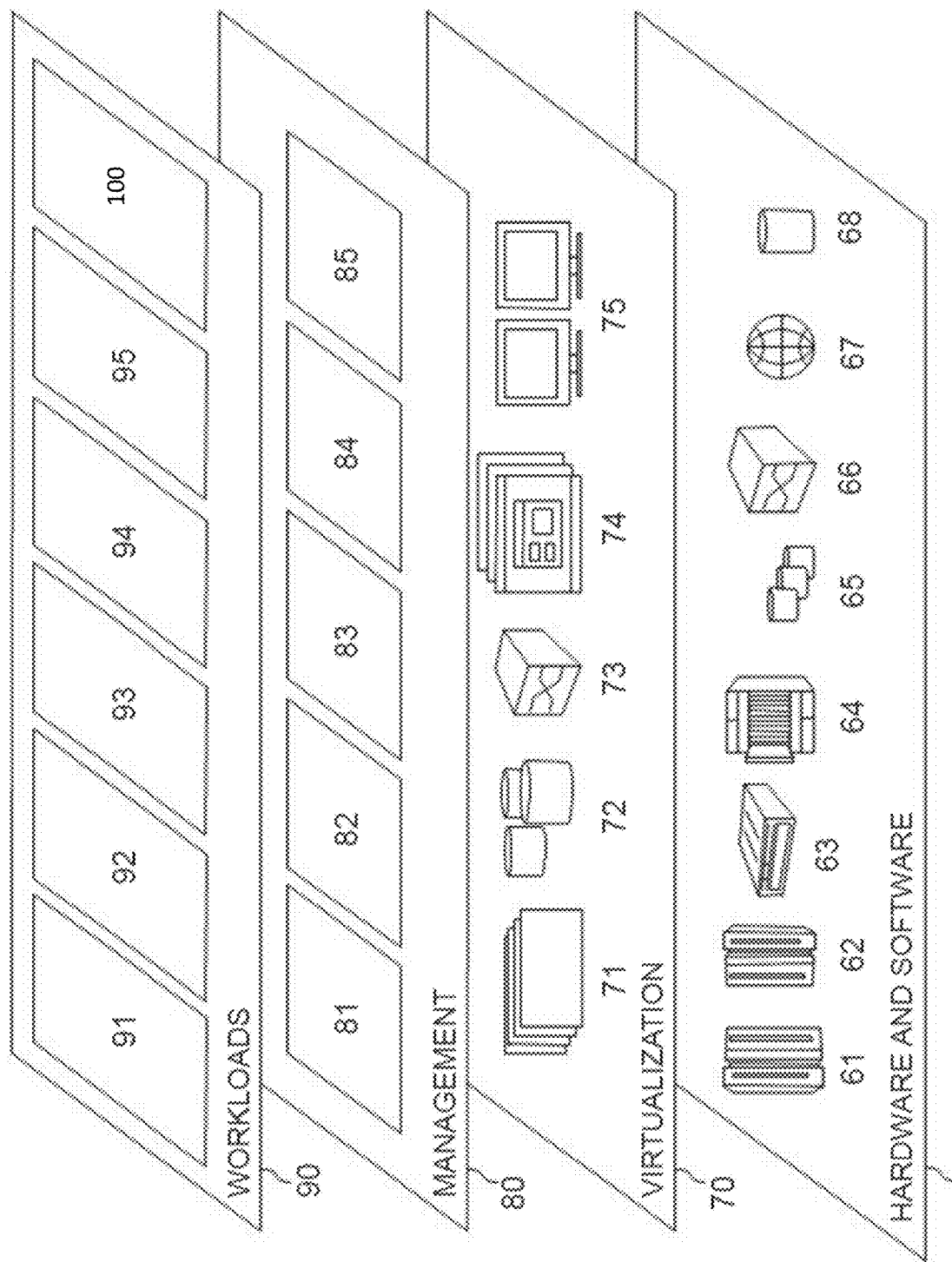
FIG. 9 depicts abstraction model layers according to an embodiment of the present invention.

Referring now to FIG. 9, an exemplary set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a trans-boundary water resource usage detection method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented transboundary water resource usage detection method, the method comprising:
    predicting an estimated water usage by an upstream administrative region using a tracked water usage and a machine learning model;
    detecting an excess water usage based on the estimated water usage exceeding a contracted usage value by more than a threshold value;
    executing a smart contract on blockchain to store the excess water usage and an amount in the blockchain; and
    penalizing the upstream administrative region for the excess water usage by executing the smart contract on the blockchain, the smart contract facilitating a token exchange on the blockchain from the upstream administrative region.

2. The method of claim 1, further comprising tracking the tracked water usage at a transboundary water resource based on a plurality of Internet-of-Things (IoT) sensors and remote sensing.

3. The method of claim 1, further comprising estimating an impact of the excess water usage by the upstream administrative region on a downstream administrative region by analyzing a plurality of economic impact factors.

4. The method of claim 1, wherein the upstream administrative region is upstream of a transboundary water resource.

5. The method of claim 1, wherein the blockchain utilizes a Transboundary Water Management Blockchain Network (TWMBN).

6. The method of claim 1, further comprising measuring the water usage pattern and amount in a transboundary resource using an ensemble of physics-based models and a pretrained artificial neural network model.

7. The method of claim 1, wherein the detecting detects the excess water usage and an amount in a cross-border common water resource using an anomaly detection of data from a hydrological monitoring IoT network.

8. The method of claim 1, wherein the excess water usage is determined via multivariate time series anomaly detection using K-means clustering with defined range thresholds.

9. The method of claim 1, wherein the threshold value is adjusted according to any of an estimated water supply, recharge, and level fluctuation.

10. The method of claim 1, wherein the blockchain is retained in a triggered state until a remediation action reduces water levels to above the threshold value.

11. A computer program product for trans-boundary water resource usage detection, the computer program product comprising a computer-readable storage medium having program instructions embodied therewith, the program instructions executable by a computer to cause the computer to perform:
predicting an estimated water usage by an upstream administrative region using a tracked water usage and a machine learning model;
detecting an excess water usage based on the estimated water usage exceeding a contracted usage value by more than a threshold value;
executing a smart contract on blockchain to store the excess water usage and an amount in the blockchain; and
penalizing the upstream administrative region for the excess water usage by executing the smart contract on the blockchain, the smart contract facilitating a token exchange on the blockchain from the upstream administrative region.

12. The computer program product of claim 11, further comprising tracking the tracked water usage at a transboundary water resource based on a plurality of Internet-of-Things (IoT) sensors and remote sensing.

13. The computer program product of claim 11, further comprising estimating an impact of the excess water usage by the upstream administrative region on a downstream administrative region by analyzing a plurality economic impact factors.

14. The computer program product of claim 11, wherein the upstream administrative region is upstream of a trans-boundary water resource.

15. The computer program product of claim 11, wherein the blockchain utilizes a Transboundary Water Management Blockchain Network (TWMBN).

16. The computer program product of claim 11, further comprising measuring the water usage pattern and amount in a trans-boundary resource using an ensemble of physics-based models and a pretrained artificial neural network model.

17. The computer program product of claim 11, wherein the detecting detects the excess water usage and an amount in a cross-border common water resource using an anomaly detection of data from a hydrological monitoring IoT network.

18. The computer program product of claim 11, wherein the excess water usage is determined via multivariate time series anomaly detection using K-means clustering with defined range thresholds.

19. A trans-boundary water resource usage detection system, the system comprising:
a processor; and
a memory, the memory storing instructions to cause the processor to perform:
predicting an estimated water usage by an upstream administrative region using a tracked water usage and a machine learning model;
detecting an excess water usage based on the estimated water usage exceeding a contracted usage value by more than a threshold value;
executing a smart contract on blockchain to store the excess water usage and an amount in the blockchain; and
penalizing the upstream administrative region for the excess water usage by executing the smart contract on the blockchain, the smart contract facilitating a token exchange on the blockchain from the upstream administrative region.

20. The system of claim 19, embodied in a cloud-computing environment.

* * * * *